United States Patent [19]

Minn

[11] Patent Number: 5,084,554
[45] Date of Patent: Jan. 28, 1992

[54] TREATING POLYMERIZED ROSIN WITH SODIUM HYDROXY METHANE SULFONATE TO IMPROVE COLOR STABILITY

[75] Inventor: James Minn, Hattiesburg, Miss.

[73] Assignee: Hercules Incorporated, Wilmington, Del.

[21] Appl. No.: 636,781

[22] Filed: Jan. 2, 1991

Related U.S. Application Data

[62] Division of Ser. No. 468,295, Jan. 22, 1990, Pat. No. 5,021,548.

[51] Int. Cl.⁵ ............................................... C09F 1/00
[52] U.S. Cl. .................................... 530/212; 530/210; 530/211
[58] Field of Search ....................... 530/212, 211, 210

[56] References Cited

U.S. PATENT DOCUMENTS 5,021,548 6/1991 Minn ................................... 530/216

Primary Examiner—Harold D. Anderson
Attorney, Agent, or Firm—Joanne W. Patterson

[57] ABSTRACT

The color stability of polymerized rosin is improved by heating the polymerized rosin at a temperature of 250°–290° C. in the presence of 0.05% to 5% sodium hydroxymethane sulfonate.

4 Claims, No Drawings

TREATING POLYMERIZED ROSIN WITH SODIUM HYDROXY METHANE SULFONATE TO IMPROVE COLOR STABILITY

This application is a division of application Ser. No. 07/468,295, filed Jan. 22, 1990, now U.S. Pat. No. 5,021,548.

FIELD OF THE INVENTION

This invention relates to a method for improving the color stability of rosin resins. This invention particularly relates to the use of sodium hydroxymethane sulfonate to produce such an improvement in color stability.

BACKGROUND OF THE INVENTION

Oxidative and color stability of rosin resins, particularly rosin esters, are very important to customers who use these resins in products such as adhesives, lacquers, and varnishes. While it is fairly easy to improve the oxidative stability of rosin resins by addition of a hindered phenol antioxidant, improvement in color stability is much more difficult to achieve.

Rosin is composed mainly of a mixture of diterpene acids, known as resin acids, with a smaller amount of other acidic and neutral bodies present. Rosin characteristically contains color bodies or coloring matter visible to the naked eye and certain color bodies that are not normally visible to the naked eye, usually referred to as latent color bodies.

The visible coloring matter in a tall oil, wood and gum rosin determines its grade and hence its value. The darker the rosin, the lower its grade and value. In the case of tall oil rosin, the latent color bodies it contains do not color the rosin until it is treated with pentaerythritol or other polyols to form an ester, or heated in the presence of oxygen, such as in the manufacture of hot melt adhesives. This discoloration renders the polyol esters produced from tall oil undesirable where a light colored product that retains its color under normal conditions of use is required.

Many methods have been described for improving the color and color stability of rosin resins. For example, U.S. Pat. No. 4,657,706 discloses heating tall oil rosin in the presence of a carboxylic acid and a Lewis acid catalyst, distilling the reaction mixture and esterifying the distilled tall oil rosin with a polyol. U.S. Pat. No. 4,657,703 discloses heating tall oil rosin in the presence of a Lewis acid catalyst, distilling the reaction mixture, and esterifying the tall oil rosin distillate with a polyol in the presence of a phenol sulfide. Japanese examined patent application JP 72-000615 describes a method for producing a rosin resin of pale color by treating the rosin with a sulphoxylic acid salt-formaldehyde adduct at 200°-260° C. in an inert gas stream. U.S. Pat. No. 3,780,012 describes a process for improving the color of tall oil rosin pentaerythritol ester by pretreating a tall oil rosin with paraformaldehyde at a temperature of 140°-180° C. for one to three hours.

Although sodium hydroxymethane sulfonate, also known as sodium bisulfite formaldehyde, has been used as a preservative in cosmetic compositions (see P. Alexander, Cosmetics and Toiletries, Vol. 102, pp. 89-92, December, 1987), its use in rosin resins has not been disclosed.

SUMMARY OF THE INVENTION

It has now been found that the addition of a small amount of sodium hydroxymethane sulfonate (SHS) to a rosin resin results in a product with the same initial color and improved color stability compared with a product that does not contain this compound. In the process of this invention for esterifying rosin resins by heating a mixture of the rosin resin and a polyol, the improvement comprises improving the color stability of the rosin ester by carrying out the esterification in the presence of sodium hydroxymethane sulfonate. Also according to the invention, the color stability of polymerized rosin is improved by heating in the presence of sodium hydroxymethane sulfonate.

DETAILED DESCRIPTION OF THE INVENTION

The rosin resins treated according to the process of this invention to improve color stability include, but are not limited to, polymerized rosin and esters of various types of rosin such as gum rosin, wood rosin, distilled tall oil rosin, and tall oil rosin that is both distilled and solvent refined.

The term polymerized rosin refers to the resinous mixture obtained when rosin is treated under various conditions with strong inorganic acids, Lewis Acids or acidic clays. The mixture comprises non-reactable rosin acids such as dehydroabietic acid, rosin acids containing some unsaturation and a number of different types of polymerized rosin acids including dimerized rosin acids. Gum rosin is obtained by tapping live pine trees and wood rosin is obtained from pine stump wood. Tall oil rosin is isolated from crude tall oil, which in turn is obtained by the acidulation of the "black liquor soap" skimmed off the concentrated alkaline digestion liquor washed out of paper pulp in the sulfate or kraft process for the manufacture of paper.

Rosin esters are typically prepared by reacting the rosin with a polyol such as, for example, pentaerythritol or glycerol, at a temperature of from about 250° C. to about 290° C., preferably 280°-285° C. The reaction can be carried out in the presence of a disproportionating agent and/or an esterification catalyst. An esterification catalyst is generally not necessary when glycerol is used as the polyol. Esterification catalysts are well known in the art and include metal salts such as, for example, calcium formate and calcium phosphonates. Disproportionation agents for rosin resins are also well known in the art and include, for example, aryl sulfides such as the phenol sulfides described in U.S. Pat. No. 4,657,703.

The sodium hydroxymethane sulfonate used in the practice of this invention to improve the color stability of rosin resins is commercially available, has the formula

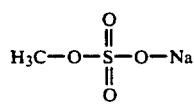

and is the addition product of formaldehyde and sodium bisulfite. It is typically present in an amount of from 0.05% to 5.0%, preferably about 0.25%, based on the weight of the rosin resin. When rosin esters are to be stabilized, SHS is present during the esterification reaction. In the case of polymerized rosin, the rosin is simply heated at a temperature of 250°-290° C. in the presence of SHS to obtain the desired effect. The heating time is generally from one half to six hours, preferably two to three hours.

The rosin color standards used in the following examples are the United States rosin grade (USRG) standards that vary from XC (lightest) through XB, XA, X, WW, WG, N, M, K, I, H, G, F, E and D (darkest). The improvement in color stability resulting from the use of sodium hydroxymethane sulfonate is usually 1-3 USRG color grades in 24 hour oven tests at 177° C., which is significant for the end uses contemplated for these resins, e.g., adhesives and coatings.

EXAMPLE 1

A one-liter, three-necked flask is fitted with a heating mantle, pot thermometer, temperature controller, glass stopper, magnetic stirring bar and side arm take-off. The side arm connects the reaction flask to a 500 ml flask fitted with an upright condenser. A tube leading into the top of the condenser provides a $CO_2$ blanket during the reaction. When the acid number of the reaction mixture drops below 30, the condenser is replaced with a glass fitting and rubber pressure tubing that leads to a vacuum pump. The system is placed under vacuum (29-30 inches), and the 500 ml flask is cooled in a wet ice bath to condense out light ends.

After the reaction flask is charged with 500 g of solvent-refined, distilled tall oil rosin (TOR), it is heated to 180° C. and stirred under $CO_2$. Pentaerythritol (57.8 g), 1.5 g of SANTONOX ® disproportionating agent (Monsanto), 1.2 g of calcium formate esterification catalyst, and 1.2 g of sodium hydroxymethane sulfonate (SHS) are added. Over a period of 30 minutes, the temperature is increased to 280° C., and held there for 4 hours. At this point the acid number is 26.8. While still at 280° C., the system is put under pump vacuum at 29-30 inches for one hour, then cooled to 200° C. and poured into an aluminum pan.

Final analysis shows an acid number of 12.6, USRG color (neat) of XB6, and yellowness index (neat) of 47. The drop softening point is 106° C.

Color stability is determined using a standard oven test, which is treatment of a 50 g sample in a 150 ml beaker for 24 hours at 177° C. in a forced draft oven. The oven treated sample has a USRG color of WG4 with a yellowness index of 117. Data for this example are summarized in Table I.

COMPARATIVE EXAMPLE 2

The procedure described in Example 1 is repeated, except that the sodium hydroxymethane sulfonate is omitted. The reaction product has an acid number of 14.5, a neat USRG color of XB6, a yellowness index of 52, and a drop softening point of 105° C.

An oven color stability test carried out as above gives a USRG color of M7 with a yellowness index of 137. Data for this example are summarized in Table I.

COMPARATIVE EXAMPLE 3

Using the same equipment as described in Example 1 except for a larger (2 liter) flask, 1000 g of solvent-refined tall oil rosin are heated and stirred under $CO_2$ at 180° C. Pentaerythritol (115.8 g), 3.0 g SANTONOX ® disproportionating agent (Monsanto) and 2.5 g of calcium formate are added. Over a period of 30 minutes the temperature is increased to 280° C., and held there for 4 hours. Sample analysis shows an acid number of 30.3. Following vacuum pump treatment (29-30 inches) for 1.5 hours, the reaction mixture is cooled to 200° C. and poured.

Final product analysis shows an acid number of 15.7, a USRG color of XA2, and a yellowness index of 78. The Ring and Ball softening point is 96.4° C.

The oven color stability test gives a USRG color of G6 with a yellowness index of 197. Data for this example are summarized in Table I.

EXAMPLE 4

The procedure described in Example 3 is repeated with the addition of 2.5 g sodium hydroxymethane sulfonate to the reaction charge. The final product has an acid number of 14.9, a USRG color of XA6, and a yellowness index of 70. The Ring and Ball softening point is 96.8° C.

The oven color stability test gives a USRG color of K6 with a yellowness index of 156. Data for this example are summarized in Table I.

COMPARATIVE EXAMPLE 5

Following the procedure described in Example 3, 1500 g of distilled tall oil rosin (LYTOR 100, Georgia Pacific) are reacted with 173.7 g pentaerythritol in the presence of 4.5 g of SANTONOX ® disproportionating agent (Monsanto) and 1.05 g of calcium formate.

Final product analysis shows an acid number of 16.1, a USRG color of XB4 and a yellowness index of 54. The Ring and Ball softening point is 95.9° C.

The oven color stability test gives a USRG color of M6 and a yellowness index of 142. Data for this example are summarized in Table I.

EXAMPLE 6

Following the procedure described in Example 5, 1000 g of LYTOR 100 distilled tall oil rosin (Georgia Pacific) are reacted with 115.8 g pentaerythritol in the presence of 3.0 g SANTONOX ® disproportionating agent (Monsanto), 0.7 g calcium formate and 2.0 g sodium hydroxymethane sulfonate.

Final product analysis shows an acid number of 19.9, a USRG color of XB6 and a yellowness index of 48. The Ring and Ball softening point is 97.4° C.

The oven color stability test gives a USRG color of N6 and a yellowness index of 125. Data for this example are summarized in Table I.

TABLE I

TALL OIL ROSIN PENTAERYTHRITOL ESTERS

| EXAMPLE | ROSIN | Weight Percent of Rosin Charge | | | | Initial | | 24 Hr. 177° C. Oven | Color |
|---|---|---|---|---|---|---|---|---|---|
| | | PENTAERYTHRITOL | Ca FORMATE | SANTONOX ® | SHS | USRG | YI | USRG | YI |
| 1 | A | 11.56 | 0.24 | 0.3 | 0.24 | XB6 | 47 | WG4 | 117 |
| 2 | A | 11.56 | 0.24 | 0.3 | 0.00 | XB6 | 52 | M7 | 137 |
| 3 | B | 11.58 | 0.25 | 0.3 | 0.00 | XA2 | 78 | G6 | 197 |
| 4 | B | 11.58 | 0.25 | 0.3 | 0.25 | XA6 | 70 | K6 | 156 |
| 5 | C | 11.58 | 0.07 | 0.3 | 0.00 | XB4 | 54 | M6 | 142 |

TABLE I-continued

TALL OIL ROSIN PENTAERYTHRITOL ESTERS

| EXAMPLE | ROSIN | Weight Percent of Rosin Charge | | | | Initial | | 24 Hr. 177° C. | |
| | | PENTAERYTHRITOL | Ca FORMATE | SANTONOX ® | SHS | USRG | YI | Oven USRG | Color YI |
| --- | --- | --- | --- | --- | --- | --- | --- | --- | --- |
| 6 | C | 11.58 | 0.07 | 0.3 | 0.20 | XB6 | 48 | N6 | 125 |

SHS = Sodium hydroxymethane sulfonate
A = Solvent-refined, distilled tall oil rosin
B = Solvent-refined tall oil rosin
C = Georgia Pacific LYTOR 100 distilled tall oil rosin
USRG and YI (yellowness index) colors are read neat.

COMPARATIVE EXAMPLE 7

A 500 g sample of solvent-refined, distilled tall oil rosin is reacted with 55.0 g glycerol in the presence of 1.5 g SANTONOX ® disproportionation agent (Monsanto) in a 1 liter flask equipped as in Example 1, except that a demister column (4 inch column packed with stainless steel) is fitted between the reaction flask and the condenser to minimize loss of glycerol. The reaction temperature is 275° C., and calcium formate catalyst is omitted.

Final product analysis shows an acid number of 10.2, a USRG color of XC0, and a drop softening point of 88° C.

The oven color stability test (24 hours, 177° C.) gives a USRG color of H5 and a yellowness index of 173. Data for this example are summarized in Table II.

EXAMPLE 8

Example 7 is repeated with the addition of 1.2 g sodium hydroxymethane sulfonate during the esterification.

Final product analysis shows an acid number of 8.8, a USRG color of XC0, and a drop softening point of 90° C.

The oven color stability test gives a USRG color of K6 and a yellowness index of 147. Data for this example are summarized in Table II.

COMPARATIVE EXAMPLE 9

Using the same equipment as Example 7, except that the reaction flask size is increased to 2 liters, 1000 g of distilled tall oil rosin (LYTOR 100, Georgia Pacific) are reacted with 96.5 g glycerol, in the presence of 3.0 g SANTONOX ® disproportionating agent (Monsanto), and 1.4 g calcium formate.

Final product analysis shows an acid number of 12.2, a USRG color of XA6, and a Ring and Ball softening point of 83.8° C.

The oven color stability test gives a USRG color of I6 and a yellowness index of 163. Data for this example are summarized in Table II.

EXAMPLE 10

Example 9 is repeated with the addition of 1.5 g sodium hydroxymethane sulfonate during the esterification.

Final product analysis shows an acid number of 11, a USRG color of XA6, and a Ring and Ball softening point of 84.2° C.

The oven color stability test gives a USRG color of K6 with a yellowness index of 149. Data for this example are summarized in Table II.

TABLE II

TALL OIL ROSIN GLYCEROL ESTERS

| EXAMPLE | ROSIN | Weight Percent of Rosin Charge | | | | Initial | | 24 Hr. 177° C. | |
| | | GLYCEROL | Ca FORMATE | SANTONOX ® | SHS | USRG | YI | Oven USRG | Color YI |
| --- | --- | --- | --- | --- | --- | --- | --- | --- | --- |
| 7 | A | 11.0 | 0.00 | 0.3 | 0.00 | XC0 | — | H5 | 173 |
| 8 | A | 11.0 | 0.00 | 0.3 | 0.24 | XC0 | — | K6 | 142 |
| 9 | C | 9.65 | 0.14 | 0.3 | 0.00 | XA6 | — | I6 | 163 |
| 10 | C | 9.65 | 0.14 | 0.3 | 0.15 | XA6 | — | K6 | 149 |

See Table 1 for footnotes.

EXAMPLE 11

The procedure described in Examples 7 and 8 is repeated except that wood rosin is substituted for the solvent refined, distilled tall oil rosin. The results are summarized in Table III. The effects on color and color stability of adding an equal amount of IRGANOX ® 1425 antioxidant (Ciba Geigy) rather than sodium hydroxymethane sulfonate (SHS) are also shown in the table. SHS outperforms the IRGANOX ® 1425 antioxidant.

EXAMPLE 12

POLY-PALE ® polymerized rosin (Hercules Incorporated) is heated for two hours at 260° C. under $CO_2$ in the presence of 0.25% sodium hydroxymethane sulfonate (SHS). Oxidative stability (measured by high pressure differential scanning calorimetry exotherm time) is improved from 60 minutes to 88 minutes.

Color stability is also improved. In 4 hour oven tests at 177° C., the SHS treated POLY-PALE ® polymerized rosin has a color of I6 compared to H0 for the untreated sample.

TABLE III

WOOD ROSIN GLYCEROL ESTERS

| | Weight Percent of Rosin Charge | | | | Initial | | 24 Hr. 177° C. Oven Color | |
|---|---|---|---|---|---|---|---|---|
| ROSIN | GLYCEROL | SANTONOX ® | SHS | OTHER* | USRG | YI | USRG | YI |
| Wood | 9.78 | 0.3 | 0.00 | 0.25** | X3 | 90 | 14 | 159 |
| Wood | 9.78 | 0.3 | 0.00 | 0.00 | WW6 | 99 | K2 | 150 |
| Wood | 9.78 | 0.3 | 0.25 | 0.00 | WW6 | 100 | M0 | 140 |

*The same antioxidant package of hindered phenol plus phosphite is added after esterification in each of these runs.
**0.25 weight % of Ciba Geigy's IRGANOX ® 1425 antioxidant is added to the charge.

What I claim is:

1. A method for improving the color stability of polymerized rosin comprising heating the rosin to a temperature of 250°–290° C. in the presence of sodium hydroxymethane sulfonate.

2. The process of claim 1 wherein the sodium hydroxymethane sulfonate is present in an amount of 0.05% to 5%, based on the weight of the rosin.

3. The process of claim 1 wherein the heating is continued for one half hour to six hours.

4. The process of claim 2 wherein the sodium hydroxymethane sulfonate is present in an amount of 0.25%, based on the weight of the rosin.

* * * * *